*Wm Westlake*
118084
PATENTED AUG 15 1871
*Improvement in Dust Pans*
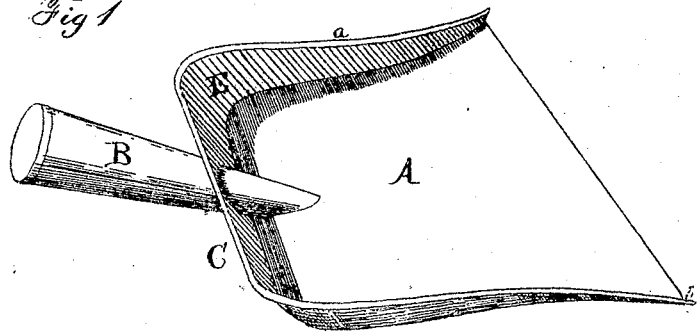
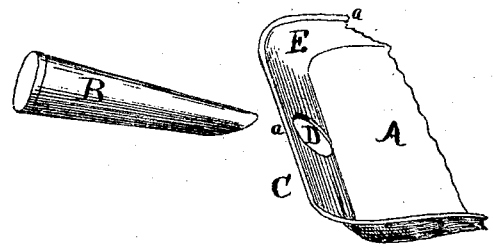
Witnesses:
L. L. Bond
O. W. Bond
William Westlake

UNITED STATES PATENT OFFICE.

WILLIAM WESTLAKE, OF CHICAGO, ILLINOIS.

IMPROVEMENT IN DUST-PANS.

Specification forming part of Letters Patent No. 118,084, dated August 15, 1871.

*To all whom it may concern:*

Be it known that I, WILLIAM WESTLAKE, of the city of Chicago, in the county of Cook and State of Illinois, have invented certain new and useful Improvements in Dust-Pans, of which the following is a full description, reference being had to the accompanying drawing making a part of this specification, in which—

Figure 1 is a perspective view, and Fig. 2 a view showing the mode of inserting the handle.

The nature of my invention consists in so applying the handle to a dust-pan that it shall have a double bracing, and thereby strengthen the pan and more securely attach the handle thereto.

In the drawing, A represents the bottom of the pan; B, the handle; C and E, the raised border; D, the hole into which the handle is inserted; and $a$, the bead or bead-wire. The body of the pan is made of the usual material and in any desired form. In the back portion C of the border I make a hole, D, just below the bead $a$, as shown. The handle B is made conical or tapering, and cut so as to fit the bottom on the inside of the pan. It is inserted into the hole D and pushed in so as to fit, when it is soldered to the bottom and to the border C, as shown at Fig. 1.

By this mode of attaching handles the interior portion acts as a brace to prevent the bottom from bending or yielding at that part, while the border C acts as a brace to prevent the loosening or detachment of the handle, thus making a durable and strong attachment of the handle to and with the pan. Rivets may be used instead of solder.

What I claim as new, and desire to secure by Letters Patent, is—

The combination of the handle B with the border C and bottom A of a dust-pan, when constructed and operating substantially as specified.

WILLIAM WESTLAKE.

Witnesses:
    L. L. BOND,
    O. W. BOND.